US012203815B2

(12) United States Patent
Cseh (10) Patent No.: US 12,203,815 B2
(45) Date of Patent: Jan. 21, 2025

(54) ELECTRONIC CIRCUIT ARRANGEMENT FOR MONITORING TEMPERATURES

(71) Applicant: ECOM INSTRUMENTS GMBH, Assamstadt (DE)

(72) Inventor: Patrick Cseh, Gerlachsheim (DE)

(73) Assignee: ECOM INSTRUMENTS GMBH (DE)

( * ) Notice: Subject to any disclaimer, the term of this patent is extended or adjusted under 35 U.S.C. 154(b) by 598 days.

(21) Appl. No.: 17/489,711

(22) Filed: Sep. 29, 2021

(65) Prior Publication Data

US 2022/0034725 A1  Feb. 3, 2022

Related U.S. Application Data

(63) Continuation of application No. PCT/EP2020/058798, filed on Mar. 27, 2020.

(30) Foreign Application Priority Data

Mar. 29, 2019 (DE) .................. 10 2019 108 304.4

(51) Int. Cl.
*G01K 7/01* (2006.01)
*G01K 7/16* (2006.01)
*H01M 10/48* (2006.01)

(52) U.S. Cl.
CPC ............. *G01K 7/01* (2013.01); *G01K 7/16* (2013.01); *H01M 10/486* (2013.01)

(58) Field of Classification Search
CPC ............ G01K 7/01; G01K 7/16; G01K 3/005; H01M 10/486; Y02E 60/10; H02H 7/18; H02H 5/042
See application file for complete search history.

(56) References Cited

U.S. PATENT DOCUMENTS 9,696,219 B2  7/2017  Geisler
9,709,446 B2  7/2017  Geisler
(Continued)

FOREIGN PATENT DOCUMENTS

CN    201274416 Y   7/2009
DE    102010049008 B3  4/2012
(Continued)

OTHER PUBLICATIONS

International Preliminary Report on Patentability dated Oct. 14, 2021 of International application PCT/EP2020/058798 on which this application is based.
(Continued)

*Primary Examiner* — Jung Kim
(74) *Attorney, Agent, or Firm* — Barnes & Thornburg LLP (57) ABSTRACT

An electronic circuit arrangement for monitoring temperatures includes an electronic temperature-determining circuit with a temperature sensor for measuring an ambient temperature in the surroundings of the temperature sensor, configured to generate a comparator input signal depending on the temperature measured by the temperature sensor, an electronic reference circuit including a secondary temperature sensor for measuring an ambient temperature of the electronic circuit arrangement which is configured to generate a secondary comparator input signal that is dependent on the temperature measured by the secondary temperature sensor, an electronic comparator circuit which compares the primary and the secondary comparator input signal and generates a comparator output signal dependent on the two input signals. The temperature-determining circuit, the reference circuit and the comparator circuit are configured such that the comparator circuit generates a trigger signal as the (Continued)

comparator output signal if the temperature measured by the temperature sensor exceeds a temperature reference value.

20 Claims, 2 Drawing Sheets

(56) References Cited

U.S. PATENT DOCUMENTS

| | | | | |
|---|---|---|---|---|
| 2007/0258503 A1* | 11/2007 | Clark, Jr. | ............... | G01K 7/015 |
| | | | | 374/161 |
| 2020/0079239 A1 | 3/2020 | Mueller et al. | | |

FOREIGN PATENT DOCUMENTS

| | | |
|---|---|---|
| DE | 102013212066 A1 | 1/2015 |
| DE | 102013217230 A1 | 3/2015 |
| DE | 102017209182 A1 | 12/2018 |
| EP | 1301014 A1 | 4/2003 |
| EP | 3388805 A1 | 10/2018 |
| WO | 2006026549 A2 | 3/2006 |

OTHER PUBLICATIONS

International Search Report dated Jun. 26, 2020 of international application PCT/EP2020/058798 on which this application is based.

* cited by examiner

ELECTRONIC CIRCUIT ARRANGEMENT FOR MONITORING TEMPERATURES

CROSS REFERENCE TO RELATED APPLICATIONS

This application is a continuation application of international patent application PCT/EP2020/058798, filed Mar. 27, 2020, designating the United States and claiming priority to German application 10 2019 108 304.4, filed Mar. 29, 2019, and the entire content of both applications is incorporated herein by reference.

TECHNICAL FIELD

The disclosure relates to an electronic circuit arrangement for monitoring temperatures and a battery cell arrangement with such an electronic circuit arrangement. The disclosure further relates to a device arrangement with such a battery cell arrangement.

BACKGROUND

In areas at risk of explosions such as oil platforms, for example, it is of central importance to precisely monitor the temperature of electrical and electronic components in order to avoid overheating of these components caused by defects; otherwise in extreme cases, such overheating could result in an explosion. Therefore, legal provisions also exist which compulsorily prescribe such temperature monitoring of critical components if these are to be used in an area at risk of explosions. This applies in particular to electrical energy storage devices such as, for example, battery cells.

It is known from the related art to use electronic circuits, hereinafter also called "electronic circuit arrangements", with integrated temperature sensors which allow monitoring of the temperature of the said components.

However, such electronic circuit arrangements are technically relatively complex in particular when a reliable and precise temperature monitoring is required, such as is necessary in particular when using the temperature-monitored component in an area at risk of explosion.

SUMMARY

It is therefore an object of the present disclosure to indicate new ways for monitoring temperatures in the development of electronic circuit arrangements.

This object is achieved by an electronic circuit arrangement for monitoring temperatures, a battery cell arrangement, and an electrical or electronic device as described herein.

A basic idea of the disclosure is accordingly to provide an electronic circuit arrangement for monitoring temperatures which not only allows a local monitoring of a temperature with the aid of an electrical temperature sensor—this is hereinafter designated as "primary temperature sensor" and can possibly be implemented in the form of a so-called electrical NTC resistance—but in which with the aid of a further temperature sensor—hereinafter designated as "secondary temperature sensor"—takes into account the temperature in the non-local surroundings of the primary temperature sensor. In this way, a trigger or defect signal which can be further processed can be generated which indicates that the temperature measured by the primary temperature sensor is too high when the temperature measured by the at least one primary temperature sensor exceeds a predetermined temperature reference value. According to the disclosure, the temperature reference value is not statically defined but depends on a temperature which is measured by a secondary temperature sensor. With a suitable arrangement of the secondary temperature sensor—in particular relative to the primary temperature sensor—the general ambient temperature can thus be taken into account when specifying the temperature reference value when it is to be ascertained whether a temperature value which is too high with respect to the temperature reference value was measured by the primary temperature sensor.

The circuit arrangement according to the disclosure presented here can be used, for example, for monitoring the temperature of one or more battery cells—these can possibly be installed in a mobile telephone. For this purpose, the primary temperature sensor can be attached to the mobile telephone in the immediate vicinity of the battery cell and the secondary temperature sensor can be attached at a distance from the battery cell—and therefore at a distance from the primary temperature sensor. If the temperature of the battery cell increases too severely, this can be measured with the primary temperature sensor. The ambient temperature in the surroundings of the mobile telephone can be taken into account with the secondary temperature sensor. In this way it is prevented that an error or trigger signal is generated exclusively on the basis of the temperature measured by the primary temperature sensor directly at the battery cell—without taking into account the ambient temperature. The circuit arrangement according to the disclosure therefore enables a particularly precise temperature monitoring in which in particular the general ambient temperature is taken into account.

An electronic circuit arrangement for monitoring temperatures comprises at least one electronic temperature-determining circuit which comprises a primary temperature sensor for measuring a temperature in the immediate surroundings of the primary temperature sensor. It is also feasible to use two or more such temperature-determining circuits which are expediently constructed identically. Thus, a temperature monitoring can be carried out at different positions spaced apart from one another.

The at least one temperature-determining circuit is designed/configured to generate a primary comparator input signal that is dependent on the temperature measured by the primary temperature sensor of the at least one temperature-determining circuit.

Furthermore, the circuit arrangement according to the disclosure comprises an electronic reference circuit which comprises a secondary temperature sensor for measuring an ambient temperature of the electronic circuit arrangement. The reference circuit is designed/configured to generate a secondary comparator input signal that is dependent on the ambient temperature measured by the secondary temperature sensor. The secondary temperature sensor therefore serves to define a reference temperature.

Furthermore, the circuit arrangement according to the disclosure comprises an electronic comparator circuit which compares the primary and the secondary comparator input signal and generates a comparator output signal dependent on the two input signals.

According to the disclosure, the temperature-determining circuit, the reference circuit and the comparator circuit are configured in such a manner and matched to one another such that the comparator circuit generates a trigger or error signal as the comparator output signal if the temperature measured by the at least one primary temperature sensor exceeds a temperature reference value. Said temperature reference value is defined with the electronic reference circuit and is dependent on the temperature measured by the secondary temperature sensor. Said temperature reference value can in this case comprise a predetermined non-variable component which is defined by corresponding electrical wiring of the reference circuit. A variable component of the temperature reference value can then be converted with the aid of the secondary temperature sensor which with suitable electrical wiring, is implemented—in similar manner to the primary temperature sensor—as an electrical component with a temperature-dependent electrical resistance.

According to an exemplary embodiment, the circuit arrangement comprises an electrical feedback which brings about an adjustment of the temperature reference value downwards when the trigger signal is generated by the comparator circuit. In this way a hysteresis can be implemented with which it can be prevented that the trigger or signal is no longer generated directly after falling below the reference temperature value and in this way the temperature monitoring is deactivated.

According to a further advantageous further development, the electronic circuit arrangement can be configured so that after a first trigger or error signal is generated, the temperature monitoring is repeated iteratively until the measured temperature has again fallen below the reference value adjusted with the electrical feedback. In this way, it can be avoided that the temperature monitoring is ended again directly after falling below the temperature reference value.

According to an advantageous further development, two or more temperature-determining circuits for measuring an ambient temperature in the immediate surroundings of the respective primary temperature sensor are provided. In this further development, the at least two temperature-determining circuits are configured such that that primary temperature sensor with the highest measured temperature is used to generate the primary comparator input signal. For this purpose, a semiconductor diode, typically in the form of a Schottky diode, can be arranged in each case in the temperature-determining circuits provided, in particular between the branch-off point and the signal output. If different temperature values are measured by the primary temperature sensors of the temperature-determining circuits so that different electrical voltage values are present at the respective branch-off points, the two semiconductor diodes or Schottky diodes have the effect that the lower of the two voltage values is provided at the signal output. Thus, the signal of that one of the primary temperature sensors which has measured the highest temperature is provided at the signal output of the temperature-determining circuits. It is thereby ensured that a trigger or error signal is generated by the comparator circuit if a single one of all the provided primary temperature sensors has already detected an exceeding of the temperature reference value.

Expediently the electronic circuit arrangement can be fitted with at least one electrical extension connection which enables the electronic circuit arrangement to be supplemented by at least one external temperature-determining circuit. In this variant, the external temperature-determining circuit is therefore not part of the circuit arrangement but cooperates with this as if it were part of the temperature-determining circuit(s) integrated in the electronic circuit arrangement. In this way, the electronic circuit arrangement can be extended in a quasi-modular manner by in principle arbitrary many temperature-determining circuits for monitoring temperatures.

Expediently, the comparator circuit can comprise a comparator element with a first and second comparator input and with a comparator output. In this variant, the first comparator input is connected electrically to a signal output of the temperature-determining circuit. The second comparator input on the other hand is connected electrically to a signal output of the reference circuit. Thus, a comparator output signal is generated at the comparator output depending on and by comparison of the comparator input signals present at the two comparator inputs, i.e., of the primary and secondary comparator input signal. Typically, the two comparator input signals and the comparator output signal comprise specific electrical voltage values.

According to another exemplary embodiment, the electronic circuit arrangement is configured such that the temperature-determining circuit, the reference circuit and the comparator circuit can be connected to a common electrical voltage source for the electrical power supply or are connected to this. In this way, the electronic circuit arrangement with the temperature-determining circuit, the reference circuit and the comparator circuit can be operated independently of the voltage value of the electrical supply voltage provided by the voltage source.

Typically, the primary and the secondary temperature sensor each comprise an electronic component whose electrical resistance is temperature-dependent. Said electronic component is in this case typically an electrical NTC resistance or a PTC resistance. In the case of an NTC resistance the electrical resistance decreases with increasing temperature. In the case of a PTC resistance the electrical resistance increases with increasing temperature.

The disclosure additionally relates to a battery cell arrangement comprising at least one battery cell for storing electrical energy. The battery cell arrangement further comprises an electrical supply connection. The electrical supply connection for connection of an electrical/electronic assembly of an electrical/electronic device to the at least one battery cell is connected electrically to this battery cell with at least one electrical supply line. In this way, the electrical/electronic device can be supplied with the electrical energy stored in the battery cell. Furthermore, the battery cell arrangement according to the disclosure comprises a semiconductor switch arranged in the electrical supply line. The semiconductor switch can be switched between an open state and a closed state. In the open state the electrical connection between the electrical supply connection and the at least one battery cell is interrupted. In the closed state this interruption is cancelled so that an electrical connection exists between the at least one battery cell and the electrical supply connection. Finally, the battery cell arrangement comprises a previously explained electronic circuit arrangement according to the disclosure. The previously explained advantages of the electronic circuit arrangement are thus also transferred to the battery cell arrangement according to the disclosure. The circuit arrangement is adapted/programmed for monitoring the temperature of the at least one battery cell and for switching the semiconductor switch between the open and the closed state. This means that the electronic circuit arrangement switches the semiconductor switch into the open state when the temperature measured by the at least one primary temperature sensor of the circuit arrangement exceeds the temperature reference value defined with the reference circuit.

According to an exemplary embodiment, the electronic circuit arrangement is supplied with electrical energy from the at least one battery cell. Thus, the provision of a separate voltage or energy source for supplying energy to the circuit arrangements, in particular the comparator circuit with the comparator element is superfluous.

According to an advantageous further development, the electronic circuit arrangement and the at least one battery cell are matched to one another in such a manner that the circuit arrangement is supplied with electrical energy from the at least one battery cell even when the semiconductor switch is open. In this way, it is ensured that the temperature monitoring with the electronic circuit arrangement can be continued even when a switchover has taken place as a result of the detected temperature exceeding of the semiconductor switch in the open state.

The disclosure further relates to an electrical or electronic device with a previously described battery cell arrangement according to the disclosure. The previously explained advantages of the battery cell arranged are thus also transferred to the device arrangement according to the disclosure. The device comprises according to the disclosure at least one electrical or/and electronic assembly which can be connected or is connected electrically to the at least one battery cell of the battery cell arrangement so that when the semiconductor switch is closed, the assembly can be supplied with electrical energy from the battery cell arrangement. The battery cell arrangement and the at least one electrical/electronic assembly can be arranged in separate housings.

According to an advantageous further development, the electronic circuit arrangement can be extended by an externally arranged temperature-determining circuit which is part of the electrical/electronic assembly and with which the temperature of the electrical/electronic device, in particular of the at least one electrical/electronic assembly can be monitored or is monitored.

Further important features and advantages of the disclosure are obtained from the drawings and from the relevant description of the figures with the drawings.

It is understood that the previously mentioned features which will be further explained hereinafter can be used not only in the respectively given combination but also in other combinations or alone without departing from the scope of the present disclosure.

Exemplary embodiments of the disclosure are shown in the drawings and will be explained in detail in the following description wherein the same reference numbers relate to the same or similar or functionally the same components.

BRIEF DESCRIPTION OF THE DRAWINGS

The disclosure will now be described with reference to the drawings wherein.

DESCRIPTION OF EXEMPLARY EMBODIMENTS

Figure 1:
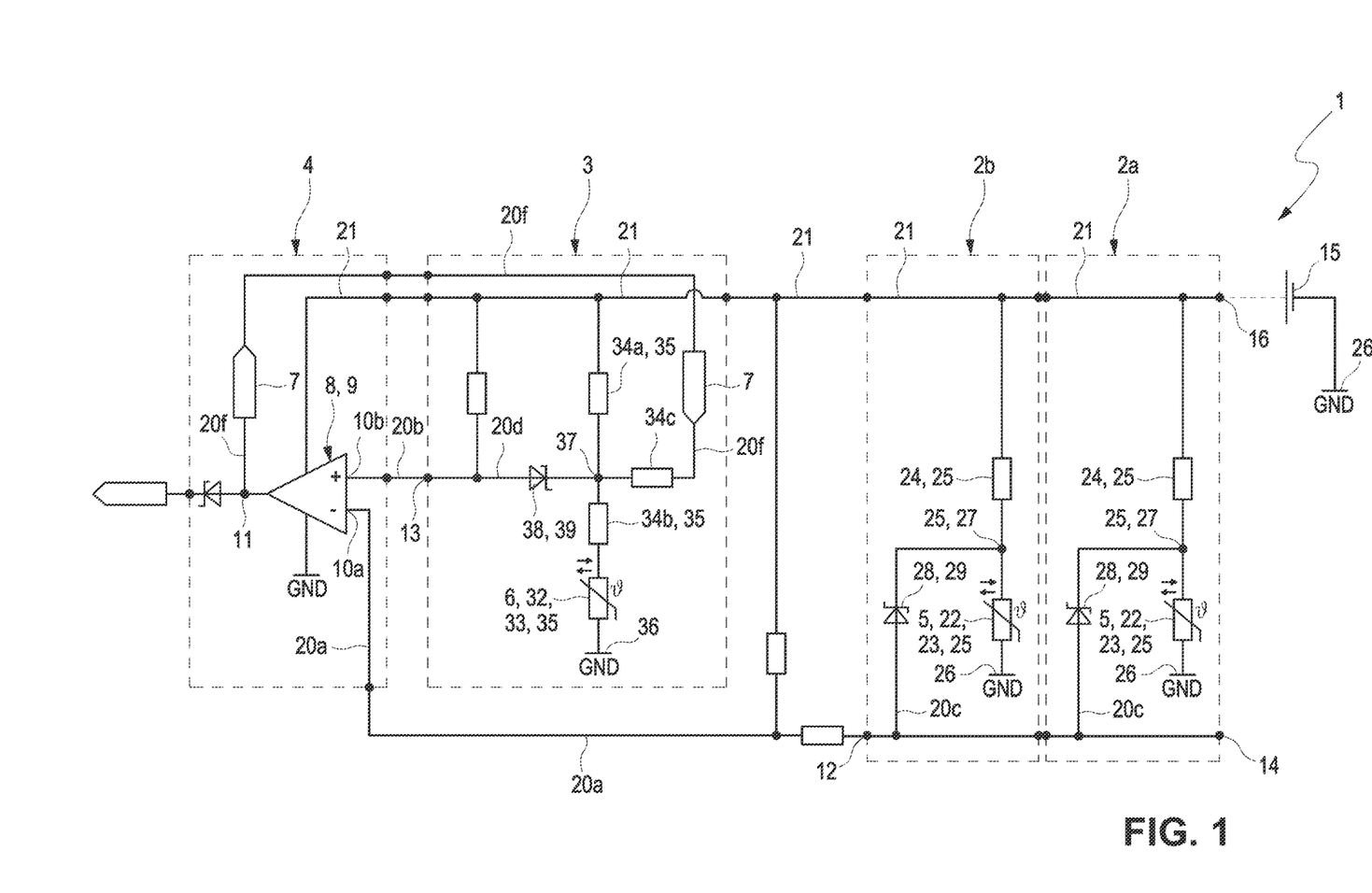
FIG. 1 shows a circuit arrangement in a circuit-diagram like diagram according to an exemplary embodiment of the disclosure.

FIG. 1 illustrates in a circuit-diagram-like diagram of an electronic circuit arrangement 1 according to an exemplary embodiment the disclosure. The circuit arrangement 1 accordingly comprises a first and a second electronic temperature-determining circuit 2a, 2b, an electronic reference circuit 3 and an electronic comparator circuit 4.

The operating mode of the first temperature-determining circuit 2a is explained hereinafter. The temperature-determining circuit 2a comprises a primary temperature sensor 5 for measuring an ambient temperature TU in the immediate surroundings of the primary temperature sensor 5. The temperature-determining circuit 2a is designed or configured for generating a primary comparator input signal which is supplied to the comparator circuit 4 for further processing. The primary comparator input signal depends on the temperature TU measured by the primary temperature sensor 5.

As can be seen in FIG. 1, the primary temperature sensor 5 of the temperature-determining circuit 2a comprises an electronic component 22 whose electrical resistance varies in a temperature-dependent manner. Expediently such an electronic component 22 can be an electrical NTC resistance 23. Alternatively to this, however, the use of a PTC resistance is also feasible. The NTC resistance 23 together with an Ohmic resistance 24 connected electrically in series forms an electrical voltage divider 25 which is arranged electrically between the supply line 21 and an electrical earth potential 26. A branch-off point 27 arranged between the primary temperature sensor 5 or the component 22 or the NTC resistance 23 and the Ohmic resistance 24 is connected electrically via an electrical conducting path 20c to a signal output 12 of the temperature-determining circuit 2a. If the electrical resistance of the primary temperature sensor 5 varies in a temperature-dependent manner, the value of the electrical voltage present at the branch-off point 27 varies accordingly. With increasing measured temperature TU, the electrical voltage present at the branch-off point 27 decreases when using an NTC resistance 23.

The second temperature-determining circuit 2b is constructed identically to the first temperature-determining circuit 2a. Preceding explanations to the first temperature-determining circuit 2a therefore apply mutatis mutandis also to the second temperature-determining circuit 2b.

The two temperature-determining circuits 2a, 2b are configured in such a manner and matched to one another so that that primary temperature sensor 5 with the highest measured temperature TU is used to generate the primary comparator input signal. For this purpose, according to FIG. 1 in both temperature-determining circuits 2a, 2b a semiconductor diode 28, typically in the form of a Schottky diode 29, is arranged between the branch-off point 27 and the signal output 12. If different temperature values are measured by the primary temperature sensors 5 of the two temperature-determining circuits 2a, 2b so that different electrical voltage values are present at the two branch-off points 27, the two semiconductor diodes 28 or Schottky diodes 29 have the effect that the lower of the two voltage values is provided at the signal output 12. Thus, at the signal output 12 of the two temperature-determining circuits 2a, 2b the signal of that one of the two primary temperature sensors 5 which has measured the higher temperature TU is provided.

The electronic reference circuit 3 is explained in detail hereinafter. In a similar manner to the temperature-determining circuits 2a, 2b, the electronic reference circuit 3 comprises a secondary temperature sensor 6 for measuring an ambient temperature TS of the electronic circuit arrangement 1. The reference circuit 3 is, in a similar manner to the temperature-determining circuit 2a or 2b, designed/configured to generate a secondary comparator input signal which is provided to the comparator circuit 4 for further processing.

As can be further seen in FIG. 1, the temperature reference value TS in the reference circuit 3 is defined with a voltage divider 35 which is formed by two Ohmic resistances 34*a*, 34*b* connected electrically in series. The voltage divider 35 is arranged electrically between the supply line 21 and an electrical earth potential 36. A branch-off point 37 arranged between the two Ohmic resistances 34*a*, 34*b* is connected electrically via an electrical conducting path 20*d* between the signal output 13 of the electronic reference circuit 3. The electrical voltage present at the branch-off point 37 is defined by the ratio of the resistance values of the two Ohmic resistances 34*a*, 34*b*.

According to FIG. 1, a semiconductor diode 38, typically in the form of a Schottky diode 39, is arranged in the reference circuit 3 between the branch-off point 37 and a signal output 13 of the reference circuit 3, in similar manner to the two temperature-determining circuits 2*a*, 2*b*. This semiconductor diode 38 or Schottky diode 39 produces an additional electrical voltage drop which compensates for the electrical voltage drop at the two semiconductor diodes 28 or Schottky diodes 29.

In addition to the two Ohmic resistances 34*a*, 34*b*, the secondary temperature sensor 6 is arranged electrically in series with these. The secondary temperature sensor 6, similarly to the first temperature sensor 5, can also be an electronic component 32 whose electrical resistance depends on the temperature and thus varies in a temperature-dependent manner. Expediently, the electronic component 32 can be an electrical NTC resistance 33. Alternatively to this however, the use of a PTC resistance is also feasible. The secondary temperature sensor 6 serves to take into account the general ambient temperature TS of the circuit arrangement 1 when monitoring temperatures. The NTC resistance 33 together with the Ohmic resistances 34*a*, 34*b* connected electrically in series forms an electrical voltage divider 35 which is arranged electrically between the supply line 21 and an electrical earth potential 36. If the electrical resistance of the secondary temperature sensor 6 varies in a temperature-dependent manner, the value of the electrical voltage present at the branch-off point 37 varies accordingly. With increasing measured temperature, the electrical voltage present at the branch-off point 37, when using an NTC resistance 33, decreases.

The electronic comparator circuit 4 is explained hereinafter. The electronic comparator circuit 4 compares the primary comparator input signal generated by the temperature-determining circuits 2*a*, 2*b* and provided at the signal output 12 with the secondary comparator input signal generated by the reference circuit 3 and provided at the signal output 13 and generates a comparator output signal depending on the two input signals.

In this case, the comparator circuit 4 generates as the comparator output signal an error or trigger signal when the temperature $T_U$ measured by at least one of the two primary temperature sensors 5 exceeds the temperature reference value $T_{Ref}$ defined with the reference circuit 3. Thus, if the temperature reference value $T_{Ref}$ is suitably defined, it can be identified that there is the risk of an overheating of the components being temperature-monitored with the primary temperature sensors 5, for example of one or more battery cells. The temperature monitoring of one or several electrical/electronic assemblies is also feasible in a similar manner. In this way, suitable counter-measures can optionally be initiated. Such a counter-measure can possibly be a more intensive temperature monitoring until this falls below the temperature reference value $T_{Ref}$ again. The electronic circuit arrangement 1 can be configured for this purpose so that after an error or trigger signal has been generated for the first time, the temperature monitoring is repeated iteratively until the temperature $T_U$ measured by the temperature-determining circuits 2*a*, 2*b* falls below the temperature reference value $T_{Ref}$ again. Alternatively or additionally as a countermeasure it is also possible to shut off the relevant component, i.e., in particular it is feasible to separate the component from the power or voltage supply. The same applies to the electrical/electronic assemblies.

According to FIG. 1, the comparator circuit 4 comprises a comparator element 8 which can be formed by an operational amplifier 9. The comparator element 8 or the operational amplifier 9 comprises a first and a second comparator input 10*a*, 10*b* as well as a comparator output 11. The comparator output signal generated by the comparator element 8 or operational amplifier 9, generated at the comparator output 11 depends on a comparison of the first comparator input signal present at the first comparator input 10*a* with the second comparator input signal present at the second comparator input 10*b*.

According to FIG. 1, the first comparator input 10*a* is connected electrically via an electrical connecting path 20*a* to the signal output 12 of the temperature-determining circuits 2*a*, 2*b*. Accordingly, the second comparator input 10*b* is connected electrically via an electrical conducting path 20*b* to the signal output 13 of the electronic reference circuit 3. In this way, the electrical voltage values provided at the signal output 12 of the temperature-determining circuits 2*a*, 2*b* or provided at the signal output 13 of the reference circuit 3 are provided to the two comparator inputs 10*a*, 10*b*.

As can be seen in FIG. 1, the electronic circuit arrangement 1 can have an electrical feedback 7 between the comparator circuit 4 and the reference circuit 3, indicated highly schematically in FIG. 1. This feedback 7 is designed so that when the error or trigger signal is generated by the comparator circuit 4, it brings about an adjustment of the temperature reference value $T_{Ref}$, typically downwards. For this purpose, an electrical conducting path 20*f* can be provided which electrically connects the comparator output 11 to the branch-off point 37 of the electronic reference circuit 3. An additional Ohmic resistance 34*c* can be arranged in the conducting path 20*f*, in similar manner to the two Ohmic resistances 34*a*, 34*b*. In this way, if the three Ohmic resistances 34*a*, 34*b*, 34*c* are suitably dimensioned, the electrical voltage present at the branch-off point 37 is increased, with the result that this is accompanied by the desired adjustment of the temperature reference value $T_{Ref}$ downwards.

As the circuit-diagram-like diagram in FIG. 1 illustrates, the electronic circuit arrangement 1 is configured in such a manner that the temperature-determining circuits 2*a*, 2*b*, the reference circuit 3 and the comparator circuit can be connected to a common electrical voltage source 15 for the purpose of the electrical voltage supply. For this purpose, a common electrical supply line 21 is provided with a supply connection 16 to which said voltage source 15 can be connected. With the common electrical supply line 21, in particular the comparator element 8 as an active electronic component can be supplied with electrical energy from the electrical voltage source 15.

According to FIG. 1, the electronic circuit arrangement 1 can also have an electrical extension connection 14 with which the temperature-determining circuits 2*a*, 2*b* of the electronic circuit arrangement 1 can be supplemented by at least one external temperature-determining circuit (not shown in FIG. 1).

Figure 2:
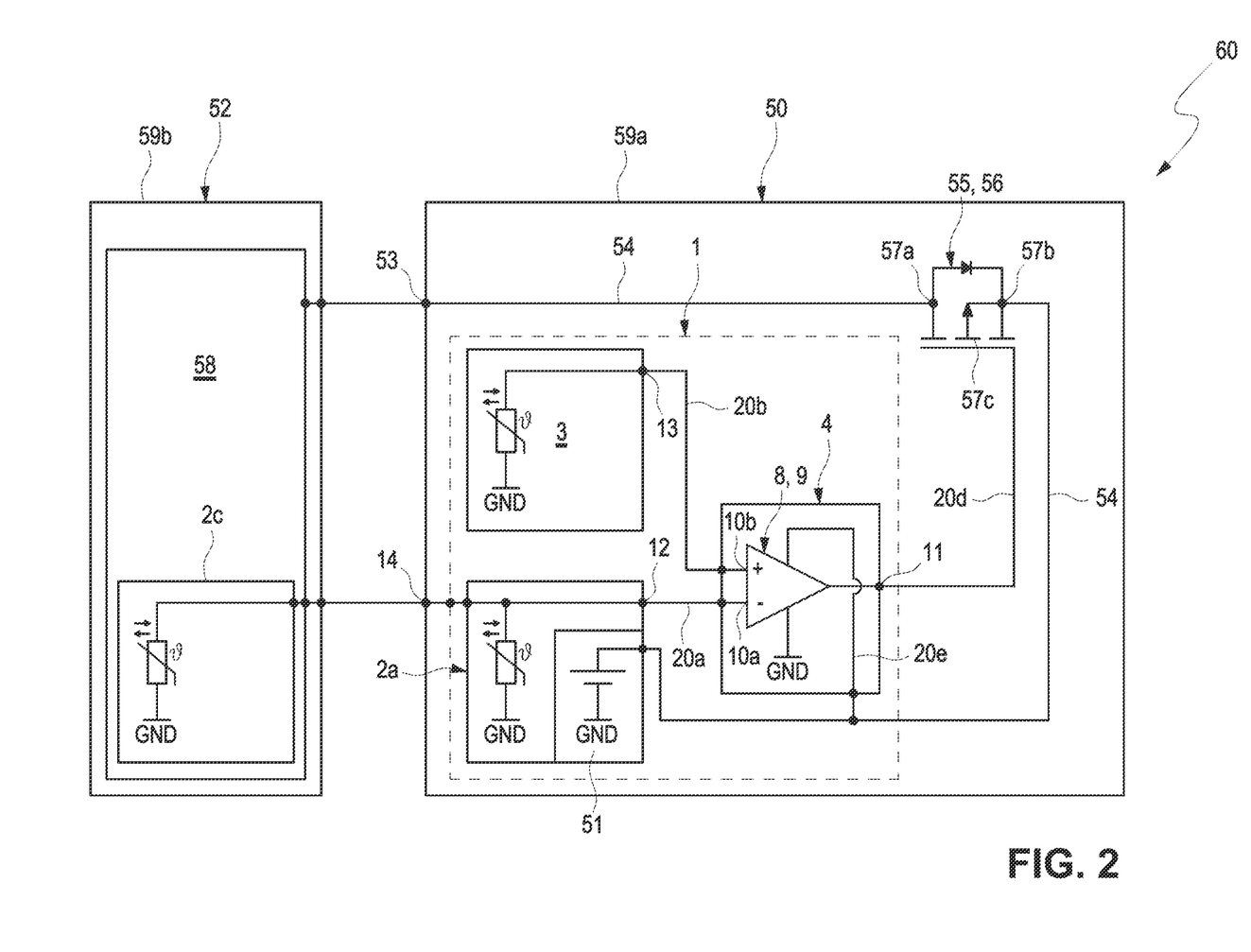
FIG. 2 shows a battery cell arrangement with an electronic circuit arrangement shown in FIG. 1 according to an exemplary embodiment of the disclosure.

FIG. 2 illustrates an application example for the electronic circuit arrangement 1 of FIG. 1. FIG. 2 shows an electrical or electronic device 60 in schematic view. The device 60 can, for example, be a mobile telephone. Accordingly, the device 60 comprises a battery cell arrangement 50 with a battery cell 51. Naturally the arrangement 50 can also comprise two or more battery cells 51 (not shown). The battery cell arrangement 50 comprises an electrical supply connection 53 which is connected electrically to the battery cell 51 with an electrical supply line 54. One or more electrical/electronic assemblies 52 with electrical/electronic components 58 of the device 60 can be connected at the electrical supply connection 53 so that these can obtain electrical energy from the battery cell 51. The battery cell arrangement 50 and the at least one electrical/electronic assembly 52 can be arranged in separate housings.

As can be seen from FIG. 2, a semiconductor switch 55 is arranged in the electrical supply line 54. The semiconductor switch 55 can be formed by a field effect (FET) transistor 56 which has a source connection 57a, a drain connection 57b and a gate connection 57c. The semiconductor switch 55 can be switched between an open state in which the electrical connection between the electrical supply connection 53 and the battery cell 51 is interrupted and a closed state in which this interruption is cancelled so that an electrical current can flow through the supply line 54. The switchover between the open and closed state is accomplished by triggering the gate connection 57c with the aid of the electronic circuit arrangement 1 which is also a part of the battery cell arrangement 50. For this purpose, the comparator output 11 of the comparator circuit 4 is connected electrically via an electrical conducting path 20d to the gate connection 57c of the semiconductor switch 55 or the FET 56.

The semiconductor switch 55 or the FET 56 and the electronic circuit arrangement 1 are matched to one another in such a manner that the semiconductor switch 55 or FET 56 is switched into the open state when the comparator circuit generates as the comparator output signal the error or trigger signal already explained in connection with FIG. 1 when the temperature reference value $T_{Ref}$ is exceeded.

As FIG. 2 illustrates, the comparator circuit 4, in particular the comparator element 8 or operational amplifier 9 is connected via an electrical conducting path 20e, which is electrically connected to the supply line 54, can be supplied with electrical energy from the battery cell 51. Expediently the electronic circuit arrangement and the at least one battery cell are matched to one another such that the circuit arrangement 1 is supplied with electrical energy from the battery cell 51 even when the semiconductor switch 55 or FET 56 is open. During operation the temperature-determining circuit 2a of the circuit arrangement 1 monitors the temperature of the battery cell 51. The operating mode of the circuit arrangement 1 has already been explained by reference to FIG. 1. The temperature-determining circuit 2a and the reference circuit 3 are shown in highly simplified form in FIG. 2 compared with the diagram in FIG. 1 for reasons of clarity.

In the example in FIG. 2 the electronic circuit arrangement 1 comprises the electrical extension connection 14 already explained in connection with FIG. 1 to which an external temperature-determining circuit 2c can be connected, which is constructed identically to the temperature-determining circuit 2a and thus follows the same functional principle. In contrast to the temperature-determining circuit 2a, however, the temperature-determining circuit 2c is not part of the electronic circuit arrangement 1 of the battery cell arrangement 50 but part of the electronic/electrical assembly 52 of the device 60. The external temperature-determining circuit 2c takes over the function of the second temperature-determining circuit 2b of FIG. 1 and monitors the temperature of the electrical/electronic components 58 of the electrical/electronic assembly 52.

It is understood that the foregoing description is that of the exemplary embodiments of the disclosure and that various changes and modifications may be made thereto without departing from the spirit and scope of the disclosure as defined in the appended claims.

What is claimed is:

1. An electronic circuit arrangement for monitoring temperatures, the electronic circuit arrangement comprising:

a temperature determining circuit assembly including two or more electronic temperature-determining circuits each including a primary temperature sensor for measuring a temperature in immediate surroundings of the primary temperature sensor and each generating a primary comparator input signal that is dependent on the temperature measured by the respective primary temperature sensor included therein, wherein the temperature measured by the primary temperature sensor included in the two or more temperature-determining circuits that is the higher or highest measured temperature is used to generate the primary comparator input signal output by the temperature determining circuit assembly;

an electronic reference circuit that includes at least one secondary temperature sensor for measuring an ambient temperature of the electronic circuit arrangement and which generates a secondary comparator input signal that is dependent on the ambient temperature measured by the secondary temperature sensor; and an electronic comparator circuit coupled to the temperature determining circuit assembly and the electronic reference circuit and which compares the the secondary comparator input signal to the primary comparator input signal output by the temperature determining circuit assembly and generates a comparator output signal dependent on the two input signals, wherein the comparator circuit generates an error signal as the comparator output signal in response to the higher or highest temperature measured by the temperature determining circuit assembly exceeding a temperature reference value defined with the electronic reference circuit, wherein the temperature reference value is dependent on the ambient temperature measured by the secondary temperature sensor.

2. The electronic circuit arrangement according to claim 1, further comprising an electrical feedback from the electronic comparator circuit to the electronic reference circuit which triggers an adjustment of the temperature reference value in response to generation of the error signal by the comparator circuit.

3. The electronic circuit arrangement according to claim 2, wherein the electronic circuit arrangement is configured such that, after the error signal is generated for a first time, the temperature monitoring of the temperature in the immediate surroundings of the primary temperature sensor is repeated iteratively until the measured temperature in the immediate surroundings of the primary temperature sensor has fallen below the temperature reference value adjusted with the electrical feedback provided from the electronic comparator circuit to the electronic reference circuit.

4. The electronic circuit arrangement according to claim 1, wherein each of the two or more electronic temperature-determining circuits of the temperature determining circuit assembly include, a semiconductor diode positioned between a branch-off point between the temperature sensor and the primary comparator signal output of the respective electronic temperature-determining circuit in the temperature determining circuit assembly, wherein the temperature determining circuit assembly operates in cooperation with the electronic comparator circuit to generate the error signal in response to at least one of the primary temperature sensors in the temperature determining circuit assembly detecting a temperature that exceeds the temperature reference value.

5. The electronic circuit arrangement according to claim 1, further comprising an extension connection with which the at least one electronic temperature-determining circuit of the temperature determining circuit assembly or the electronic circuit arrangement is supplemented by at least one external temperature-determining circuit.

6. The electronic circuit arrangement according to claim 1, wherein the electronic comparator circuit includes a comparator element with first and second comparator inputs and a comparator output, and
wherein the first comparator input is connected electrically to a signal output of at least one electronic temperature-determining circuit of the temperature determining circuit assembly and the second comparator input is connected electrically to a signal output of the electronic reference circuit.

7. The electronic circuit arrangement according to claim 1, wherein the temperature-determining circuit assembly, the reference circuit and the comparator circuit are connected or connectable to a common electrical voltage source for an electrical power supply.

8. The electronic circuit arrangement according to claim 1, wherein the primary temperature sensors of the temperature-determining circuit assembly, and the secondary temperature sensor of the electronic reference circuit each include an electronic component with a temperature-dependent electrical resistance, and
wherein the electronic component is an electrical NTC resistance or a PTC resistance.

9. A battery cell arrangement comprising:
at least one battery cell;
an electrical supply connection for connection of an electronic assembly of an electronic device to the at least one battery cell via at least one electrical supply line;
a semiconductor switch arranged in the electrical supply line, wherein the semiconductor is configured to be switched between an open state, in which the electrical connection between the electrical supply connection and the at least one battery cell is interrupted, and a closed state, in which this interruption is discontinued; and
at least one electronic circuit arrangement configured to monitor the temperature of the at least one battery cell and to switch the semiconductor switch between the open and the closed state,
wherein the at least one electronic circuit arrangement includes:
a temperature determining circuit assembly including two or more electronic temperature-determining circuits each including a primary temperature sensor for measuring a temperature in immediate surroundings of the primary temperature sensor and each generating a primary comparator input signal that is dependent on the temperature measured by the respective primary temperature sensor included therein, wherein the temperature measured by the primary temperature sensor included in the two or more temperature-determining circuits that is the higher or highest measured temperature is used to generate the primary comparator input signal output by the temperature determining circuit assembly,
an electronic reference circuit that includes at least one secondary temperature sensor for measuring an ambient temperature of the electronic circuit arrangement and which generates a secondary comparator input signal that is dependent on the ambient temperature measured by the secondary temperature sensor; and
an electronic comparator circuit coupled to the temperature determining circuit assembly and the electronic reference circuit and which compares the secondary comparator input signal to the primary comparator input signal output by the temperature determining circuit assembly and generates a comparator output signal dependent on the two input signals,
wherein the comparator circuit generates an error signal as the comparator output signal in response to the higher or highest temperature measured by the temperature determining circuit assembly exceeding a temperature reference value defined with the electronic reference circuit, wherein the temperature reference value is dependent on the ambient temperature measured by the secondary temperature sensor.

10. The battery cell arrangement according to claim 9, wherein the at least one electronic circuit arrangement is coupled to the at least one battery cell and is supplied with electricity by the at least one battery cell.

11. The battery cell arrangement according to claim 9, wherein the at least one electronic circuit arrangement is supplied with electrical energy from the at least one battery cell regardless of whether the semiconductor switch is in the open or closed state.

12. An electronic device, comprising:
a battery cell arrangement according to claim 9; and
at least one electronic assembly electrically connectable or connected electrically to the at least one battery cell of the battery cell arrangement such that, when the semiconductor switch is closed, the electronic assembly is supplied with electrical energy from the battery cell arrangement.

13. The electronic device according to claim 12, wherein the at least one electronic circuit arrangement is extended by an external electronic temperature-determining circuit which is part of the at least one electronic assembly, wherein the external temperature-determining circuit is configured to monitor the temperature of the at least one electronic.

14. The battery cell arrangement according to claim 9, wherein the electronic circuit arrangement further comprises an electrical feedback from the electronic comparator circuit to the electronic reference circuit which triggers an adjustment of the temperature reference value in response to generation of the error signal by the comparator circuit.

15. The battery cell arrangement according to claim 14, wherein the electronic circuit arrangement is configured such that, after the error signal is generated for a first time, the temperature monitoring of the temperature in the immediate surroundings of the primary temperature sensor is repeated iteratively until the measured temperature in the immediate surroundings of the primary temperature sensor has fallen below the temperature reference value adjusted with the electrical feedback provided from the electronic comparator circuit to the electronic reference circuit.

16. The battery cell arrangement according to claim 9, wherein each of the two or more electronic temperature-determining circuits of the temperature determining circuit assembly include, a semiconductor diode positioned between a branch-off point between the temperature sensor and the primary comparator signal output of the respective electronic temperature-determining circuit in the temperature determining circuit assembly, wherein the temperature determining circuit assembly operates in cooperation with the electronic comparator circuit to generate the error signal in response to at least one of the primary temperature sensors in the temperature determining circuit assembly detecting a temperature that exceeds the temperature reference value.

17. The battery cell arrangement according to claim 9, further comprising an extension connection with which the at least one electronic temperature-determining circuit of the temperature determining circuit assembly or the electronic circuit arrangement is supplemented by at least one external temperature-determining circuit.

18. The battery cell arrangement according to claim 9, wherein the electronic comparator circuit includes a comparator element with first and second comparator inputs and a comparator output, and wherein the first comparator input is connected electrically to a signal output of at least one electronic temperature-determining circuit of the temperature determining circuit assembly and the second comparator input is connected electrically to a signal output of the electronic reference circuit.

19. The battery cell arrangement according to claim 9, wherein the temperature-determining circuit assembly, the reference circuit and the comparator circuit are connected or connectable to a common electrical voltage source for an electrical power supply.

20. The battery cell arrangement according to claim 9, wherein the primary temperature sensors of the temperature-determining circuit assembly, and the secondary temperature sensor of the electronic reference circuit each include an electronic component with a temperature-dependent electrical resistance, and wherein the electronic component is an electrical NTC resistance or a PTC resistance.

* * * * *